(12) United States Patent
Queveau et al.

(10) Patent No.: US 7,278,675 B2
(45) Date of Patent: Oct. 9, 2007

(54) DEVICE FOR PROTECTING OBJECTS DISPOSED IN THE REAR TRUNK OF A MOTOR VEHICLE HAVING A RETRACTABLE ROOF

(75) Inventors: Gérard Queveau, Le Pin (FR); Paul Queveau, Montravers (FR); Jean-Marc Guillez, Cirieres (FR)

(73) Assignee: Heuliez, Le Pin (FR)

( * ) Notice: Subject to any disclaimer, the term of this patent is extended or adjusted under 35 U.S.C. 154(b) by 248 days.

(21) Appl. No.: 11/057,761

(22) Filed: Feb. 14, 2005

(65) Prior Publication Data

US 2006/0001286 A1  Jan. 5, 2006

(30) Foreign Application Priority Data

Jul. 2, 2004  (FR) .................................. 0451428

(51) Int. Cl.
*B60J 7/00* (2006.01)
(52) U.S. Cl. .................. 296/107.08; 296/37.1
(58) Field of Classification Search ........... 296/107.08, 296/37.1
See application file for complete search history.

(56) References Cited

FOREIGN PATENT DOCUMENTS

| | | |
|---|---|---|
| DE | 200 12 866 | 8/2001 |
| DE | 101 31 599 | 1/2003 |
| DE | 101 31 886 | 1/2003 |
| EP | 1 022 175 | 7/2000 |
| EP | 1 228 914 | 8/2002 |
| FR | 2 796 901 | 2/2001 |
| FR | 2 842 481 | 7/2002 |
| WO | WO 2004/009386 | 1/2004 |

*Primary Examiner*—Joseph D. Pape
(74) *Attorney, Agent, or Firm*—Nawrocki, Rooney & Sivertson, P.A.

(57) ABSTRACT

The invention relates to a device for protecting objects that are disposed in the rear trunk of a motor vehicle having a retractable roof. The device comprises a panel that is movable between a lowered position and a raised position, at least one sensor arranged to detect the position of said panel, releasable latches for locking the lid relative to the trunk, and a control unit for releasing said latches. The control unit releases the latches responsive to a command to move the roof or the lid of the trunk, and when the position of the panel as detected by the sensor is compatible with the movement requested. This enables the lid to open selectively from the front backwards or from the rear towards the front of the vehicle.

4 Claims, 2 Drawing Sheets

DEVICE FOR PROTECTING OBJECTS DISPOSED IN THE REAR TRUNK OF A MOTOR VEHICLE HAVING A RETRACTABLE ROOF

BACKGROUND OF THE INVENTION

The invention relates to a device for protecting objects that are disposed in the rear trunk of a motor vehicle, said vehicle having a retractable roof that is movable between a deployed position in which it covers the passenger compartment of the vehicle and a folded-away position in which it is stowed inside the trunk which is closed by a lid.

In such vehicles, it is useful to provide a device for protecting objects that are disposed inside the trunk, such a device making it possible to avoid any damage being done to said objects when folding away the roof or when closing the trunk.

In addition, in certain vehicles of such a type, having retractable roof, the closure and opening movements of the lid of the rear trunk are fully automated. In particular, the lid of the rear trunk can be hinged so that it can be opened both from the front backwards, in order to enable the roof to be stowed away, and also from the rear forwards, in order to enable objects to be stowed inside said trunk.

It is already known, from Document FR 2 842 481, that a protection device exists that is arranged to make it possible to protect the luggage regardless of the direction of the closure movement of the lid of the trunk.

SUMMARY OF THE INVENTION

Unfortunately, such a device does not make it possible to avoid damage being done to the elements forming the roof, or to any other elements such as a back shelf system disposed in the lid of the trunk, when the trunk lid is automatically caused to move.

In order to remedy that drawback, the invention proposes a device for protecting objects that are disposed in the rear trunk of a vehicle, which device makes it possible not only to provide effective protection for the objects disposed in the trunk, but also to guarantee that, in particular, the roof elements are not damaged as they are being stowed away inside the trunk, while the trunk lid is moving in automated manner.

To this end, the invention provides a device for protecting objects that are disposed in the rear trunk of a motor vehicle, said vehicle having a retractable roof that is movable between a deployed position in which it covers the passenger compartment of the vehicle and a folded-away position in which it is stowed inside the trunk which is closed by a lid, said device comprising:

a panel that is movable between a lowered position, in which it defines a top surface for the volume available for objects disposed on the bottom of said rear trunk, and in which the roof can be stowed away, and a raised position in which it vacates most of the internal volume of said rear trunk, with the roof being in the deployed position; and at least one sensor arranged to detect the position of said panel;

said device further comprising releasable latches for locking the lid relative to the trunk, and a control unit for releasing said latches, said unit being arranged to release the latches when a command to move the roof or the lid of the trunk is activated, and when the position of the panel as detected by the sensor is compatible with the movement requested, so as to enable said lid to be opened selectively from the front backwards or from the rear towards the front of the vehicle.

Thus, such a device guarantees that the lid of the rear trunk can be opened automatically only when the respective positions of the various elements (panel, roof) are mutually compatible.

Otherwise, any automated movement of the lid of the trunk is inhibited.

In one embodiment, the panel is made up of at least two elements that are hinged relative to each other about a transverse axis, said axis being substantially perpendicular to the longitudinal axis of the vehicle, said elements being mounted to move between a first position, in which they are in alignment so as to make it possible both to stow the roof and to stow objects in the trunk, and a second position, in which said elements form an angle relative to each other so as to make it possible to stow objects in the trunk inside a maximum volume, with the roof being in the deployed position.

This arrangement makes it possible to optimize the volume for stowage of objects inside the trunk, when the roof is in the deployed position.

Also, the control unit may be arranged to trigger totally automated movement of the lid of the trunk.

And, in particular, the control unit may advantageously be arranged to trigger, in synchronized and automated manner, opening or closure of the roof, and opening or closure of the lid of the trunk.

BRIEF DESCRIPTION OF THE DRAWINGS

Other objects and advantages of the invention appear from the following description given with reference to the accompanying drawings, in which.

DETAILED DESCRIPTION OF THE INVENTION

Figure 1:
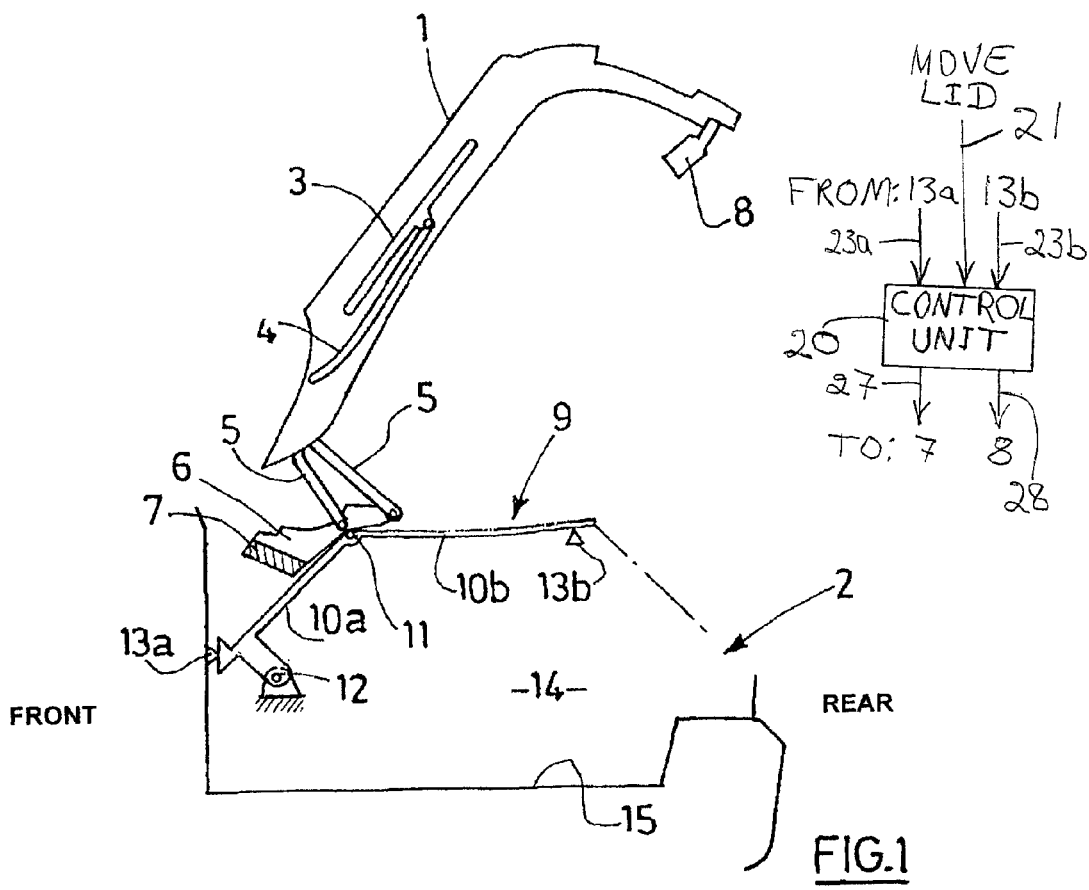
FIG. 1 is a diagrammatic side view of the rear trunk of a motor vehicle, showing the lid of the trunk in the open position, and the panel in the raised position, with is the roof being in the deployed position.

As shown in the drawings, the vehicle equipped with an object protection device of the invention has a lid 1 for a rear trunk 2. In the embodiment shown, the lid 1 is provided with a guide device for guiding a back shelf 3, which device comprises a system of runners 4 and makes it possible to stow the back shelf 3 under the trunk lid 1 when the roof (not shown) is deployed, and to deploy the back shelf 3 towards the front of the vehicle in alignment with the trunk lid 1 when the roof is stowed in the trunk 2.

The lid 1 is provided with two levers 5 situated on its front portion and hinged to a releasable support 6, and with two releasable latches 7, 8 situated respectively at the front of said lid 1 and at the rear thereof. The releasable latch 7 situated at the front serves to make it possible to open the lid 1 from the front backwards, when the roof is to be stowed in the trunk 2, and the rear releasable latch 8 serves to make it possible to open the lid from the rear forwards, when objects such as luggage are to be stowed in the trunk 2. Latches 7, 8 release or lock according to signals from a control unit 20 and carried to latches 7, 8 on paths 27 and 28 respectively.

The panel 9 of the device is made up of two elements 10a, 10b that are hinged together about a transverse axis 11 that is substantially perpendicular to the longitudinal axis of the vehicle, the longitudinal direction of the vehicle being defined as being the front (FRONT)-rear (REAR) direction. The front element 10a of the panel is itself hinged about an axis 12 situated in the trunk 2.

Two position sensors 13a, 13b for sensing the position of said panel 9 are provided respectively on the front element 10a and on the rear element 10b of said panel. Sensors 13a, 13b provide on oaths 27, 28 respectively, signals to control unit 20 that define the position of panel 9.

Operation of such a device is described below with reference to FIGS. 1 to 4;

As shown in FIG. 1, the lid 1 of the trunk is in the open position, the roof (not shown) being in the deployed position. In FIG. 1, the two elements 10a, 10b of the panel 9 form an angle relative to each other, so that it is possible to stow objects in that portion 14 of the trunk which is situated under the panel, by using a maximum volume. In this position, if a command to close the trunk lid 1 is provided on path 21 to control unit 20, the position of the panel 9 that is detected by the sensors 13a, 13b is such that the closure movement is authorized, and can take place in automated manner, i.e. without any manual action from the user of the vehicle. In this case, control unit 20 sends a release signal to latch 7, or 8 on path 27 or 28 respectively. To this end, it is also possible to provide a mechanical, hydraulic or electrical device making it possible to automate the movement of the lid.

Figure 2:
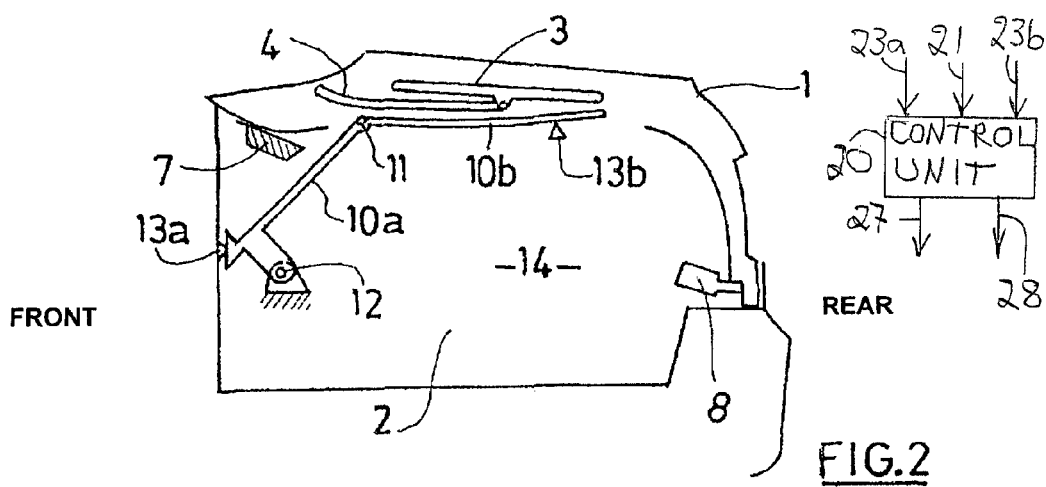
FIG. 2 is a view similar to the FIG. 1 view, showing the lid of the trunk in the closed position, with the panel being in the raised position.

The lid then goes to the configuration shown in FIG. 2, in which the lid 1 of the trunk is in the closed position. In this position, the front element 10a of the panel 9 is inclined, and the rear element 10b matches the inside periphery of the trunk lid 1, without being in contact with the shelf system 3, thereby enabling it to protect said shelf system.

Figure 3:
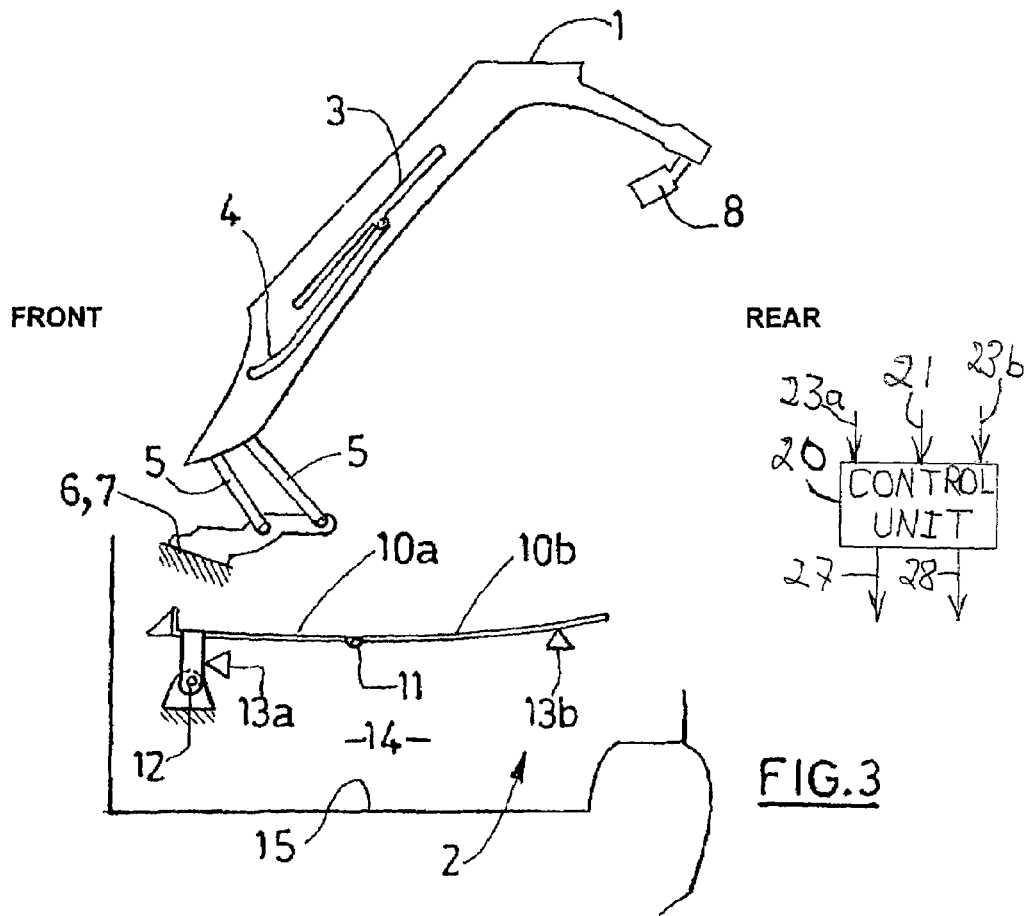
FIG. 3 is a view similar to the views in the preceding figures, showing the lid of the trunk in the open position, and the panel in the lowered position.
Figure 4:
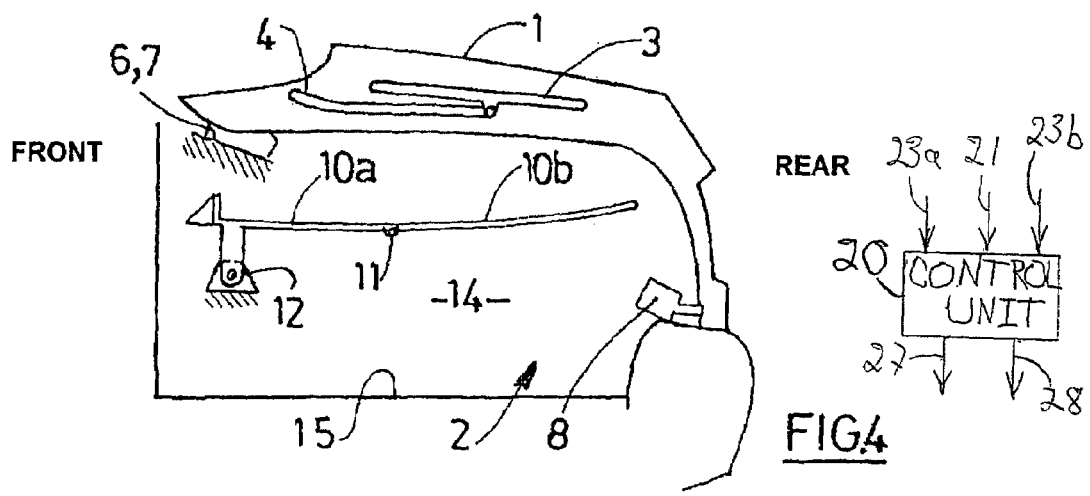
FIG. 4 is a view similar to the views of the preceding figures, showing the lid of the trunk in the closed position, and the panel in the lowered position.

As shown in FIG. 3, the lid 1 of the trunk is open so as to make it possible to access any objects situated inside the trunk. In this figure, the elements 10a, 10b of the panel 9 are in alignment with one another, this position making it possible to protect the roof elements, when said roof elements are stowed inside the trunk, between the lid 1 of the trunk and the top surface of the panel 9, and to protect the luggage disposed between the bottom 15 of the trunk and the bottom surface of the panel 9.

Thus, in this position, if a command to close the trunk lid is sent to control unit 20 on path 21, control unit 20 detects from signals on paths 23a, 23b from sensors 13a, 13b respectively, the position of the panel 9 and that the closure movement is authorized, and can be achieved in an entirely automated manner. The lid 1 then goes into its configuration shown in FIG. 4. In addition, when the panel 9 is in this position, the command is arranged also to trigger, in synchronized and fully automated manner, stowage of the roof inside the trunk 2 and deployment of the shelf 3.

The invention claimed is:

1. A device for protecting objects that are disposed in the rear trunk of a motor vehicle, said trunk having an interior, said vehicle having a retractable roof that is movable between a deployed position in which it covers the passenger compartment of the vehicle and a folded-away position in which it is stowed inside the trunk which is closed by a lid, said device comprising:
   a panel that is movable between a lowered position, in which said panel defines a top surface for the interior of said rear trunk available for objects disposed on the bottom of said rear trunk, and in which the roof can be stowed away, and a raised position in which said panel vacates most of the interior of said rear trunk, with the roof being in the deployed position; and
   at least one sensor arranged to detect the position of said panel;
   said device being characterized in that it further comprises releasable latches disposed at the front and rear of the lid for locking the lid relative to the trunk, and a control unit for releasing said latches, said unit being arranged to release the latches when a command to move the roof or the lid of the trunk is activated, and when the position of the panel as detected by the sensor is compatible with the movement requested, so as to enable said lid to be opened selectively from the front backwards or from the rear towards the front of the vehicle.

2. A device according to claim 1, characterized in that said panel is made up of at least two elements that are hinged relative to each other about a transverse axis, said axis being substantially perpendicular to the longitudinal axis of the vehicle, said elements being mounted to move between a first position, in which they are in alignment so as to make it possible both to stow the roof and to stow objects in the trunk, and a second position, in which said elements form an angle relative to each other so as to make it possible to stow objects in the trunk inside a maximum volume, with the roof being in the deployed position.

3. A device according to claim 1, characterized in that the control unit is arranged to trigger totally automated movement of the lid of the trunk.

4. A device according to claim 3, characterized in that the control unit is arranged to trigger, in synchronized and automated manner, opening or closure of the roof, and opening or closure of the lid of the trunk.

* * * * *